US010218614B2

(12) United States Patent
Badillo et al.

(10) Patent No.: US 10,218,614 B2
(45) Date of Patent: Feb. 26, 2019

(54) ETHERNET TO SPACEWIRE BRIDGE

(71) Applicant: Honeywell International Inc., Morris Plains, NJ (US)

(72) Inventors: Alvin Badillo, Quebradillas, PR (US); David Jay Kessler, Tampa, FL (US); Brett Douglas Oliver, Tampa, FL (US); Barry Lawrence Allred, Tampa, FL (US)

(73) Assignee: Honeywell International Inc., Morris Plains, NJ (US)

( * ) Notice: Subject to any disclaimer, the term of this patent is extended or adjusted under 35 U.S.C. 154(b) by 103 days.

(21) Appl. No.: 15/247,699

(22) Filed: Aug. 25, 2016

(65) Prior Publication Data

US 2018/0062987 A1   Mar. 1, 2018

(51) Int. Cl.
*H04L 12/721* (2013.01)
*H04L 12/823* (2013.01)
(Continued)

(52) U.S. Cl.
CPC ........ *H04L 45/66* (2013.01); *H04L 12/40006* (2013.01); *H04L 12/66* (2013.01);
(Continued)

(58) Field of Classification Search
CPC ......... H04L 45/66; H04L 69/22; H04L 47/32; H04L 47/6245; H04L 61/6022;
(Continued)

(56) References Cited

U.S. PATENT DOCUMENTS 6,249,528 B1 * 6/2001 Kothary ................ H04L 49/256
370/395.53
6,473,825 B1 * 10/2002 Worley ................ G06F 13/4031
710/305

(Continued)

OTHER PUBLICATIONS

Cook et al., "Ethernet over Space Wire—software issues", Mar. 2007, Science Direct, Acta Astronautica 61 (2007) 250-256, 7 Pages.*

(Continued)

*Primary Examiner* — Ivan O Latorre
(74) *Attorney, Agent, or Firm* — Fogg & Powers LLC

(57) ABSTRACT

A system for interfacing Ethernet with SpaceWire comprises a processor including an Ethernet MAC, and a bridge device connected between the processor and a SpaceWire subsystem or network. The bridge device comprises a SpaceWire physical interface that receives SpaceWire data packets, and an Ethernet MAC packet builder that includes digital logic for segmentation of the data packets into Ethernet compatible packet segments. An Ethernet media independent interface receives the packet segments from the packet builder and outputs the packet segments to the Ethernet MAC. The Ethernet media independent interface also receives Ethernet data packets transmitted from the Ethernet MAC. An Ethernet MAC packet extractor receives the Ethernet data packets from the Ethernet media independent interface and includes digital logic for performing reassembly of the Ethernet data packets into SpaceWire compatible data packets, which are sent to the SpaceWire physical interface for transmission to the SpaceWire subsystem or network.

19 Claims, 7 Drawing Sheets

(51) Int. Cl.

| | |
|---|---|
| *H04L 12/805* | (2013.01) |
| *H04L 12/863* | (2013.01) |
| *H04L 12/933* | (2013.01) |
| *H04L 29/12* | (2006.01) |
| *H04L 29/06* | (2006.01) |
| *H04L 12/40* | (2006.01) |
| *H04L 12/66* | (2006.01) |

(52) U.S. Cl.
CPC .............. *H04L 47/32* (2013.01); *H04L 47/36* (2013.01); *H04L 47/6245* (2013.01); *H04L 49/109* (2013.01); *H04L 61/6022* (2013.01); *H04L 69/22* (2013.01); *H04L 2012/4028* (2013.01)

(58) Field of Classification Search
CPC ....... H04L 47/36; H04L 49/109; H04L 12/66; H04L 12/40006; H04L 2012/4028
See application file for complete search history.

(56) References Cited

U.S. PATENT DOCUMENTS

| | | | | |
|---|---|---|---|---|
| 6,963,561 | B1* | 11/2005 | Lahat | H04L 69/16 370/356 |
| 9,819,616 | B2* | 11/2017 | Norridge | H04L 49/9042 |
| 2003/0137975 | A1* | 7/2003 | Song | H04J 3/0652 370/353 |
| 2003/0174729 | A1* | 9/2003 | Heink | H04L 49/30 370/466 |
| 2004/0246995 | A1* | 12/2004 | El Kolli | H04L 12/40091 370/503 |
| 2005/0135355 | A1* | 6/2005 | Muthukrishnan | H04L 49/254 370/389 |
| 2005/0207436 | A1* | 9/2005 | Varma | H04L 1/0083 370/412 |
| 2006/0050739 | A1* | 3/2006 | Narad | H04L 69/22 370/476 |
| 2009/0245245 | A1* | 10/2009 | Malwankar | G06F 13/4059 370/389 |
| 2010/0235696 | A1* | 9/2010 | Emam | G01B 31/318536 714/727 |
| 2011/0214043 | A1* | 9/2011 | Wilt | G06F 11/1625 714/820 |
| 2014/0068590 | A1* | 3/2014 | Natsume | G06F 8/65 717/170 |
| 2014/0362861 | A1* | 12/2014 | Norridge | H04L 45/34 370/392 |
| 2014/0376570 | A1* | 12/2014 | Gray | H04L 7/00 370/509 |

OTHER PUBLICATIONS

Rooks, John W., "High Performance Space Computing", Oct. 2006, Information Directorate Airforce Research Laboratory, 9 pages.*
European Patent Office, "Extended European Search Report for EP Application 17184829.4", Foreign Counterpart to U.S. Appl. No. 15/247,699, dated Oct. 16, 2017, pp. 1-10, Published in: EP.
Arase et al., "SpaceWire-to-GigabitEther and SpareWire backplan—SpareWire test and verification, Short Paper", 2014 International Spacewire Conference (Spacewire), Sep. 22, 2014, pp. 1-4.
Cobham, "GRESB SpaceWire/Ethernet Bridge with Routing Capabilities—2016 User's Manual", GRESB-UM Version 1.5.13, Apr. 2016, pp. 1-28, Publisher: www.cobham.com/gaisler.
"Diagnostic SpaceWire Interface", Jan. 26, 2008, pp. 1-1, Publisher: 4Links Limited.
"Test, control, and simulation interface to SpaceWire from Gbit Ethernet and IP", Jan. 26, 2008, pp. 1-2, Publisher: 4Links Limited.
Cook et al., "Ethernet Over Spacewire—Hardware Issues", International Astronautical Congress, Sep. 2006, pp. 1-7.
"SpaceWire based chipset 'MultiBoard' for space applications", downloaded May 17, 2016 from http://multicore.ru/index.php?id=1318, pp. 1-3.
"Test, control, and simulation interface to SpaceWire from Ethernet and Internet", Jan. 26, 2008, pp. 1-2, Publisher: 4Links Limited.
"Open-Source version of SpaceWire-to-GigabitEther using ZestET1", retrieved Jul. 3, 2016 from https://github.com/yuasatakayuki/SpaceWireToGigabitEther, pp. 1-4.
"PCI to SpaceWire and 1553 Bridge", Jun. 2007, pp. 1-45, Publisher: Gaisler Research AB.
Isomaki et al., "Ethernet to SpaceWire Bridge—An Evolution of Services", International SpaceWire Conference 2011, Nov. 8-10, No. 1-11.
Marshall et al., "A One Chip Hardened Solution for High Speed Spacewire System Implementations", IEEE Space Wire Conference 2007, Sep. 17-19, 2007, pp. 1-31.
Rozanov et al., "Problems of Developing Spacewire-Ethernet Bridge and Transferring Spacewire Packages Over Ethernet", Proceedings of the 16th Conference of FRUCT Association, Oct. 29-31, 2014, pp. 171-176.
Yablokov et al., "Protocol for Connection Ethernet Interface to SpaceWire Networks", Proceeding of the 17th Conference of FRUCT Association, Apr. 30, 2015, pp. 355-361.

* cited by examiner

ETHERNET TO SPACEWIRE BRIDGE

BACKGROUND

Radiation tolerant single board computers (SBCs) integrate system on chips (SOCs), designed for earth based applications, and implement system level fault tolerance mechanisms to allow these SOCs to be usable in space applications. These radiation tolerant SBCs implement a number of communication interfaces on custom made application specific integrated circuits (ASICs) or field programmable gate arrays (FPGAs). The SOCs typically provide some type of shared parallel bus to enable onboard data communication with peripheral ASICs or FPGAs implementing such interfaces. The data bandwidth of the shared bus must be divided between all the connected peripheral interfaces and ASICs or FPGAs. This can lead to throughput and latency performance issues.

SpaceWire (SpW) is a spacecraft communication network based in part on the IEEE 1355 standard of communications. Various devices used during spaceflight need to be connected to SpaceWire subsystems or networks. For high-bandwidth input/output (I/O) interfaces, such as SpaceWire interfaces, it is desirable to use dedicated point-to-point I/O interfaces on SOCs. With commercial SOCs, these point-to-point interfaces typically support Ethernet (IEEE 802.3) protocols. However, commercial SOC processors do not directly support the SpaceWire interfaces required for space applications, and include a limited set of interface choices for connecting SpaceWire devices. The SOC interfaces conventionally used for SpaceWire connectivity suffer from either high complexity or lower-than-required performance. While prior approaches have demonstrated the feasibility of bridging Ethernet I/O to SpaceWire at the physical (PHY) interface layer, the lack of radiation-tolerant PHY devices, as well as the added cost, complexity, and power, makes such approaches impractical.

SUMMARY

A system for interfacing Ethernet with SpaceWire comprises a processor including at least one Ethernet media access controller (MAC), and a bridge device operatively connected between the processor and a SpaceWire subsystem or network. The bridge device comprises a SpaceWire physical interface operative to receive SpaceWire data packets from the SpaceWire subsystem or network, and a receive first in first out (FIFO) buffer operative to receive the SpaceWire data packets from the SpaceWire physical interface. An Ethernet MAC packet builder is operative to receive the SpaceWire data packets from the receive FIFO buffer, with the Ethernet MAC packet builder including digital logic for segmentation of each of the SpaceWire data packets into Ethernet compatible packet segments. An Ethernet media independent interface is operatively connected between the Ethernet MAC packet builder and the Ethernet MAC of the processor. The Ethernet media independent interface is configured to receive the packet segments from the Ethernet MAC packet builder and to output the packet segments to the Ethernet MAC of the processor. The Ethernet media independent interface is also configured to receive Ethernet data packets transmitted from the Ethernet MAC of the processor. An Ethernet MAC packet extractor is operative to receive the Ethernet data packets from the Ethernet media independent interface, with the Ethernet MAC packet extractor including digital logic for performing reassembly of the Ethernet data packets into SpaceWire compatible data packets. A transmit FIFO buffer is operative to receive the reassembled data packets from the Ethernet MAC packet extractor, and to send the reassembled data packets to the SpaceWire physical interface for transmission to the SpaceWire subsystem or network.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
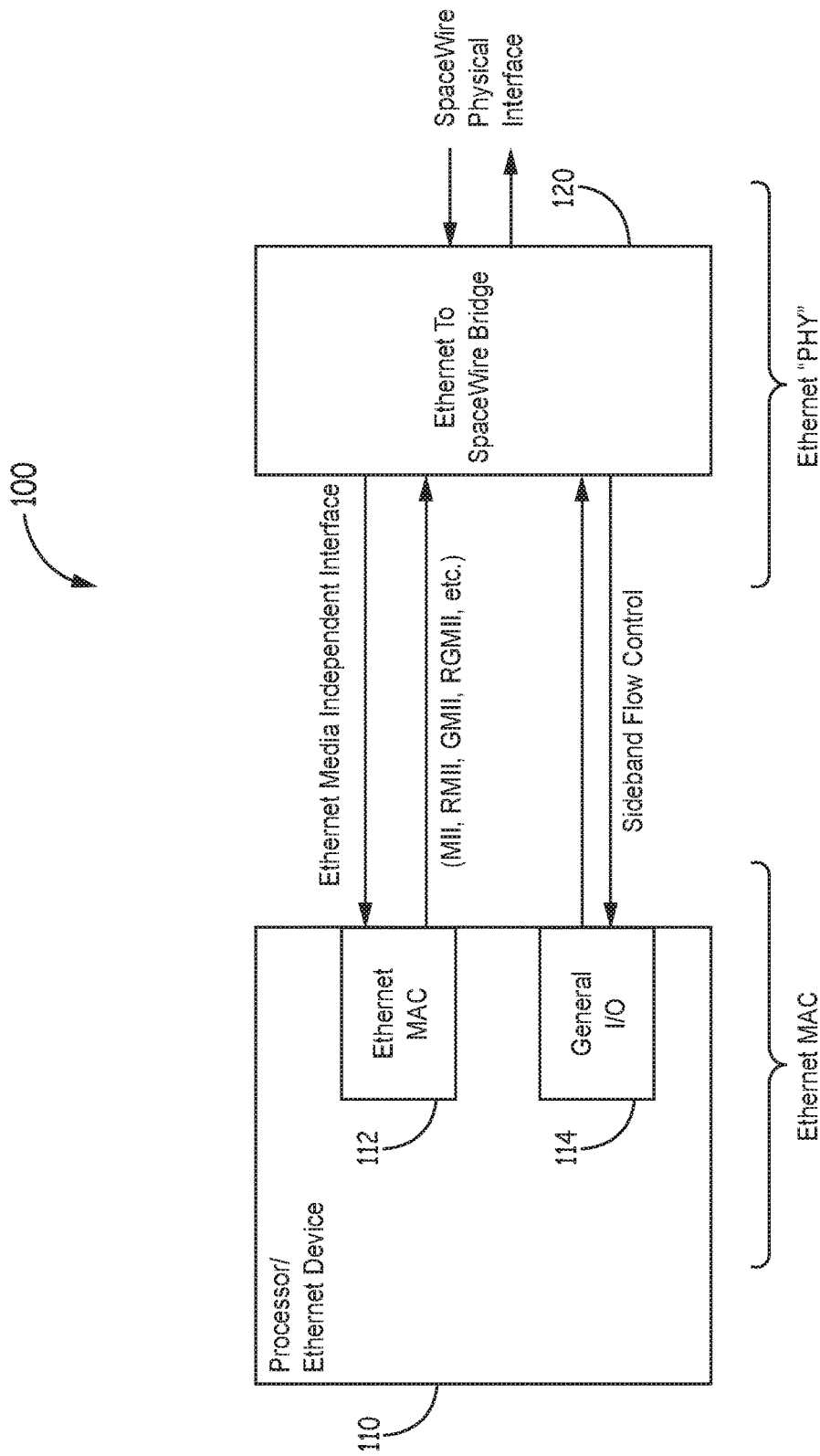
FIG. 1 is a block diagram of a bridge system for interfacing a processor/Ethernet device with a SpaceWire subsystem/network, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for connecting Ethernet to SpaceWire (SpW) is disclosed herein. The system and method utilize an Ethernet to SpaceWire bridge device, which provides bridging of an Ethernet interface at a media access control layer.

Ethernet is logically segmented into several layers, from software application layers down to low-level wires. Processors and network devices typically contain an Ethernet Media Access Controller (MAC). These connect to Physical (PHY) interfaces that handle the connection to the wires. The present approach takes advantage of the Ethernet interfaces available in the various processors and rarely used for space applications.

The present method enables connecting SpaceWire interfaces to existing system on chip (SOC) point-to-point Ethernet MAC interfaces without the use of physical (PHY) devices in order to achieve improved bandwidth and latency performance, with reduced design complexity and improved radiation tolerance. In addition, the present approach allows single-board computers (SBC) based on commercial SOC processors, which are targeted at commercial space applications, to provide higher SpaceWire performance using a lower complexity, lower cost method than conventional alternatives.

The present Ethernet to SpaceWire bridge device enables concurrent high data throughput SpaceWire interfaces by enabling the use of MAC blocks featured on many conventional SOCs to exchange SpaceWire data between an SOC and a SpaceWire interface. These MAC block enabled data paths are exclusively dedicated to SpaceWire data exchange and are not shared with other interfaces implemented on the SBC. The data is exchanged using a media independent interface (MID, which is designed to interface to Ethernet PHY level transceiver chips. Therefore, this approach avoids altogether the poor performance problem due to bus contention seen on SpaceWire interfaces that follow conventional design approaches of interfacing peripherals through a shared data bus.

In one embodiment, the Ethernet interfaces can be implemented with a standard MII, which is intended to connect to a standard Ethernet PHY device. The bridge device acts as a SpaceWire network node that masquerades as an Ethernet PHY device to the Ethernet interface.

The present Ethernet to SpaceWire bridge device does not implement nor require an Ethernet network. Rather, the bridge device is connected on one side directly to a MAC block using an MII, and on the other side presents a full standard SpaceWire interface by implementing queuing and flow control digital logic in between. The bridge device can be considered a SpaceWire PHY (physical level chip) that enables the use of MAC blocks that implement the MII interface to directly attach to SpaceWire networks.

There are two types of SpaceWire packets, which are noted at packet termination: (1) normal, valid packets, in which all data is valid and good; and (2) error, invalid packets, in which something is wrong with the packet. The bridge device is configured to forward this information with the packets. While SpaceWire packets have no defined data limit, a standard Ethernet packet is limited to payload data of 1500 bytes.

Ethernet packets have various information fields including source, destination, type/length, and frame check sequence (FCS). The source and destination fields are typically not used in this method, but the FCS is calculated and checked for all Ethernet packets. The Ethernet type/length field is used for in-band signaling of segmentation state. For example, bits 15:14 provide the segmentation state, with 2'b00 the multiple segment start; 2'b01 the multiple segment middle; 2'b10 the segment end, no error; and 2'b11 the segment end, error. The bits 13:0 provide the physical packet length, and allows enough space to support standard (1500) and Jumbo (about 9000) byte frames. The Ethernet packets must be padded to 46 bytes of payload. The type/length field allows for removal of any required padding, for example if a received length is greater than the ethertype[11:0] length.

The bridging function can be performed in real time, and is a realized by a combination of driver software running on a processor and a digital logic implemented in the bridge device. During operation, the bridge device receives a SpaceWire packet from a SpaceWire network up to a predefined maximum transfer unit (MTU) size or a SpaceWire packet end, and the SpaceWire packet is segmented. A segment is either the MTU or the packet end if less than the MTU. The segments are marked as one of: start, middle, end normal, end error. Only end normal or end error is important since they terminate a packet. The start and middle just serve as status indicators and indicate that the segment is "not end of packet." The bridge device transmits each segment as they are created. The transmitted packet segment source and destination MAC fields are statically defined by configuration registers. An FCS is calculated and appended for each segment. The received SpaceWire packets of length less than the predefined MTU are transmitted as "end" immediately. A start packet is not required, and the next packet is the one following an "end"—either end of packet (EOP) or error end of packet (EEP). The SpaceWire packet continues to be received while segments of the packet are transmitted to the Ethernet MAC, and a processor reassembles the segments.

During operation of the bridge device in transmitting a data packet from Ethernet to SpaceWire, software on the processor segments a SpaceWire packet into Ethernet packet payloads, which have a maximum of 1500 bytes per packet. The software sets the Ethernet type/length field to designate length and termination. The processor Ethernet hardware/software creates Ethernet MAC packets and transmits to the physical interface (PHY), using predetermined source/destination, a chosen segmentation Ethernet type/length field, and a computed valid FCS. The Ethernet to SpaceWire bridge function acts as the PHY interface, by validating the FCS, removing unneeded Ethernet MAC packet data, combining multiple segments together with segmentation data, and transmitting on SpaceWire. The end of packet terminator is transmitted as specified in the segmentation state of the last packet (EOP or EEP).

Further details of the present systems and methods are described hereafter with reference to the drawings.

FIG. 1 illustrates a bridge system 100 for interfacing a processor or Ethernet device 110 with a SpaceWire subsystem or network, according to one embodiment. The processor/Ethernet device 110 generally includes an Ethernet MAC 112 and a general I/O 114, which compose an Ethernet MAC layer. The Ethernet MAC 112 is in operative communication with an Ethernet to SpaceWire bridge 120 through an Ethernet media independent interface, such as a standard media independent interface (MID, a reduced media independent interface (RMII), a gigabit media independent interface (GMII), a reduced gigabit media independent interface (RGMII), or the like. The general I/O 114 is in operative communication with the Ethernet to SpaceWire bridge 120 through a sideband flow control interface. The Ethernet to SpaceWire bridge 120 is configured as an Ethernet "PHY" layer, and is in operative communication with a SpaceWire physical interface that communicates with the SpaceWire subsystem or network.

Figure 2:
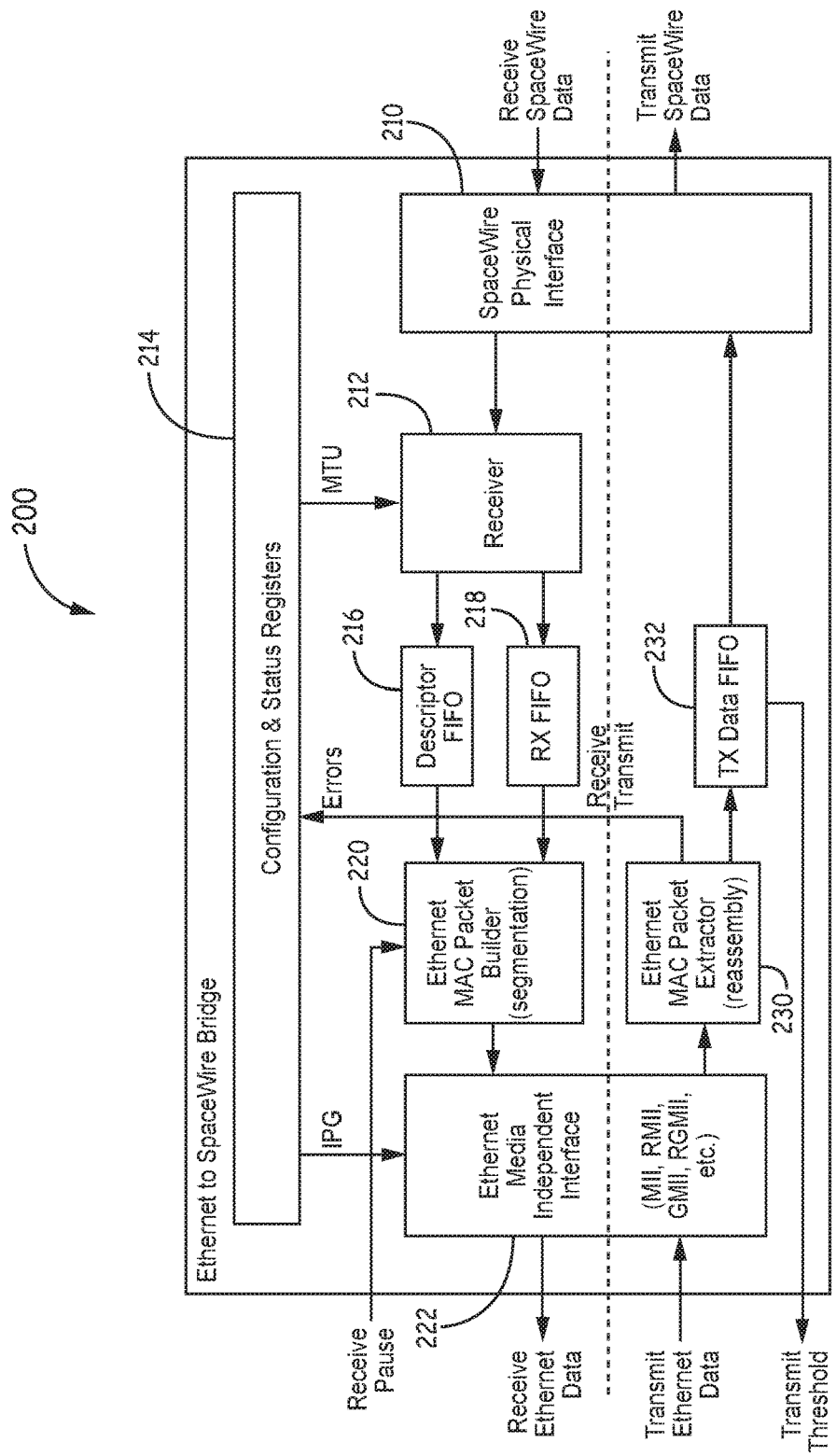
FIG. 2 is a block diagram of an Ethernet to SpaceWire bridge device, according to one embodiment.

FIG. 2 illustrates an Ethernet to SpaceWire bridge device 200, according to one embodiment. The bridge device 200 includes a SpaceWire physical interface 210 operative to receive SpaceWire data from a SpaceWire subsystem or network, and to transmit SpaceWire data to the SpaceWire subsystem or network. A bridge receiver 212 is in operative communication with physical interface 210 and is configured to receive SpaceWire data packets from physical interface 210. A set of configuration and status registers 214 is in operative communication with bridge receiver 212 and is configured to provide a predefined maximum transfer unit (MTU) to bridge receiver 212. A descriptor first in first out (FIFO) buffer 216 is in operative communication with bridge receiver 212 and is configured to receive descriptor information for the data packets from bridge receiver 212. A receive (RX) FIFO buffer 218 is also in operative communication with bridge receiver 212 and is configured to receive message information for the data packets from bridge receiver 212.

An Ethernet MAC packet builder 220 is in operative communication with descriptor FIFO buffer 216 and receive FIFO buffer 218. The Ethernet MAC packet builder 220 includes digital logic for performing segmentation of the data packet information received from buffers 216 and 218. The data packet segmentation operation is described in further detail hereafter. In addition, a receive pause signal is sent from a processor/Ethernet device connected to bridge device 200 to Ethernet MAC packet builder 220.

The bridge device 200 also includes an Ethernet media independent interface 222, which is in operative communication with Ethernet MAC packet builder 220 as well as configuration and status registers 214. The Ethernet media independent interface 222 is configured to receive inter-packet gap (IPG) information from configuration and status registers 214, and to receive segmented data packets from Ethernet MAC packet builder 220. The Ethernet media independent interface 222 is operative to output the segmented data packets, which are received as Ethernet data when a processor/Ethernet device is connected to bridge device 200.

The Ethernet media independent interface 222 is also configured to receive Ethernet data transmitted from the processor/Ethernet device for transmission to the SpaceWire subsystem or network. An Ethernet MAC packet extractor 230 is in operative communication with Ethernet media independent interface 222 and is configured to receive Ethernet data packets from Ethernet media independent interface 222. The Ethernet MAC packet extractor 230 includes digital logic for performing reassembly of the Ethernet data packets, which is described in further detail hereafter. The Ethernet MAC packet extractor 230 outputs an errors signal to configuration and status registers 214. A transmit data FIFO buffer 232 is in operative communication with Ethernet MAC packet extractor 230 and is configured to receive the reassembled data packets from Ethernet MAC packet extractor 230. The transmit data FIFO buffer 232 sends the reassembled data packets to physical interface 210 for transmission to the SpaceWire subsystem or network. The transmit data FIFO buffer 232 also sends a transmit threshold feedback signal to the processor/Ethernet device for sideband flow control.

Figure 3:
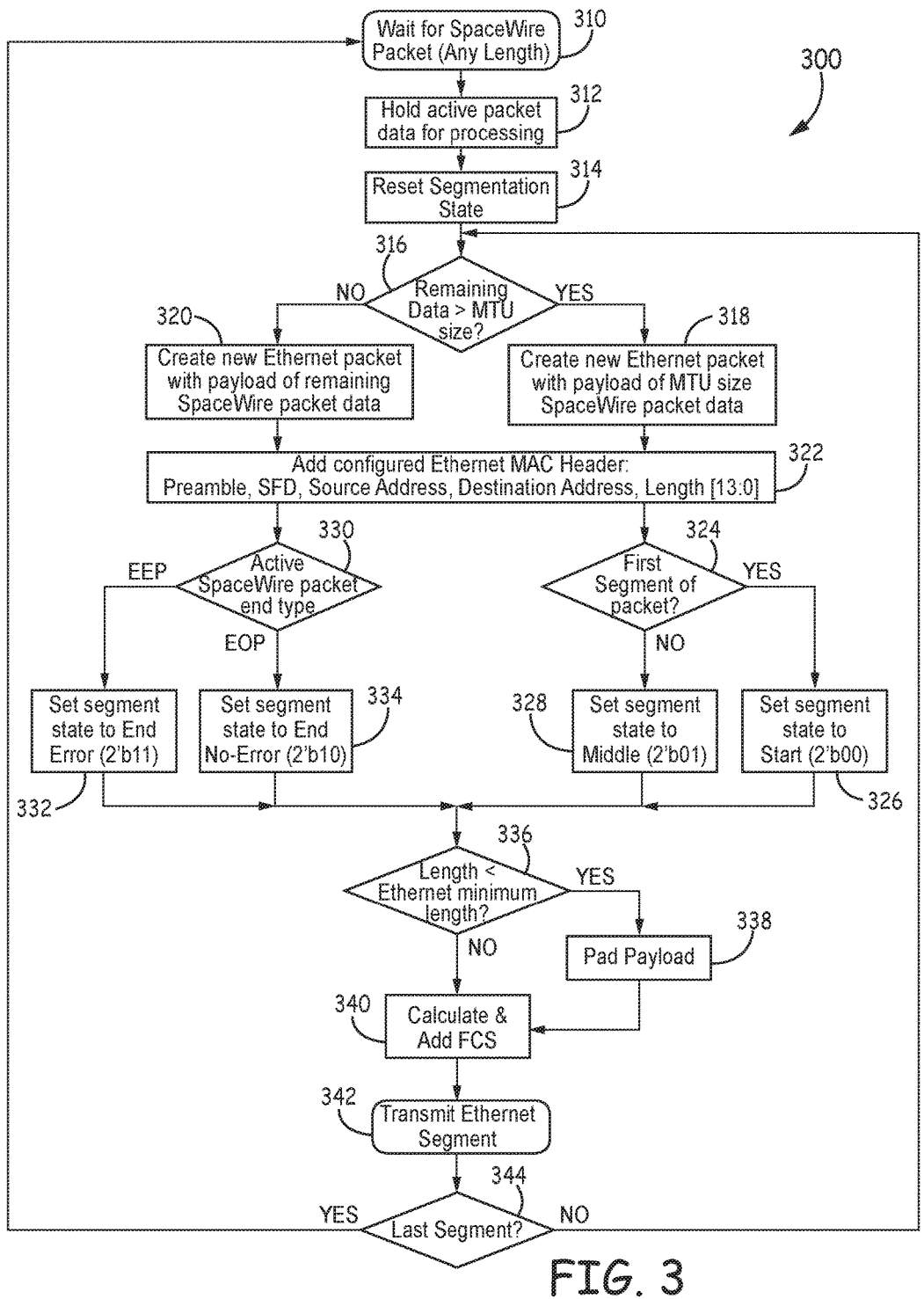
FIG. 3 is a flow diagram of a method for transmitting data packets from a SpaceWire subsystem/network to a processor/Ethernet device, according to one approach.

FIG. 3 is a flow diagram of a method 300 for transmitting data packets from a SpaceWire subsystem/network to a processor/Ethernet device using the present Ethernet to SpaceWire bridge system, according to one approach. The method 300 can be implemented using digital logic implemented in the bridge system components.

Initially, method 300 waits for a SpaceWire packet of any length (block 310), and holds active packet data for processing (block 312). A segmentation state for the packet is then reset (block 314), and a determination is made whether any remaining data is greater than the maximum transfer unit (MTU) size (block 316). If the remaining data is greater than the MTU size, method 300 creates a new Ethernet packet with a payload of MTU size SpaceWire packet data (block 318). If the remaining data is not greater than the MTU size, method 300 creates a new Ethernet packet with a payload of the remaining SpaceWire packet data (block 320). In either case, method 300 then adds a configured Ethernet MAC Header, including a preamble, start frame delimiter (SFD), source address, destination address, and length [13:0] (block 322).

When an Ethernet MAC header is added for a new Ethernet packet with a payload of MTU size SpaceWire packet data (from block 318), a determination is made whether this is a first segment of a packet (block 324); if yes, the segment state is set to Start (2'b00) (block 326); if no, the segment state is set to Middle (2'b01) (block 328). When an Ethernet MAC header is added for a new Ethernet packet with a payload of the remaining SpaceWire packet data (from block 320), a determination is made of the active SpaceWire packet end type (block 330). If the end type is Error End of Packet (EEP), the segment state is set to End Error (2'b11) (block 332). If the end type is End of Packet (EOP), the segment state is set to End No-Error (2'b10) (block 334).

Thereafter, method 300 determines whether the length of the Ethernet packet segment is less than the Ethernet minimum length (block 336). If the length of the packet segment is less than the Ethernet minimum length, the payload of the packet segment is padded (block 338), and the Frame Check Sequence (FCS) is calculated and added to the packet segment (block 340). If the length of the packet segment is not less than the Ethernet minimum length, the FCS is calculated and added to the packet segment (block 340) without padding the payload.

The method 300 then transmits the Ethernet packet segment to the processor/Ethernet device (block 342). A determination is then made whether the transmitted packet segment was the last segment of the current SpaceWire packet (block 344). If not the last segment, method 300 returns to block 316 to determine whether any remaining data is greater than the MTU size and repeats the above described steps thereafter. If the transmitted packet segment was the last segment, method 300 returns to block 310 to wait for a new SpaceWire packet and then repeats the above described steps thereafter.

Figure 4:
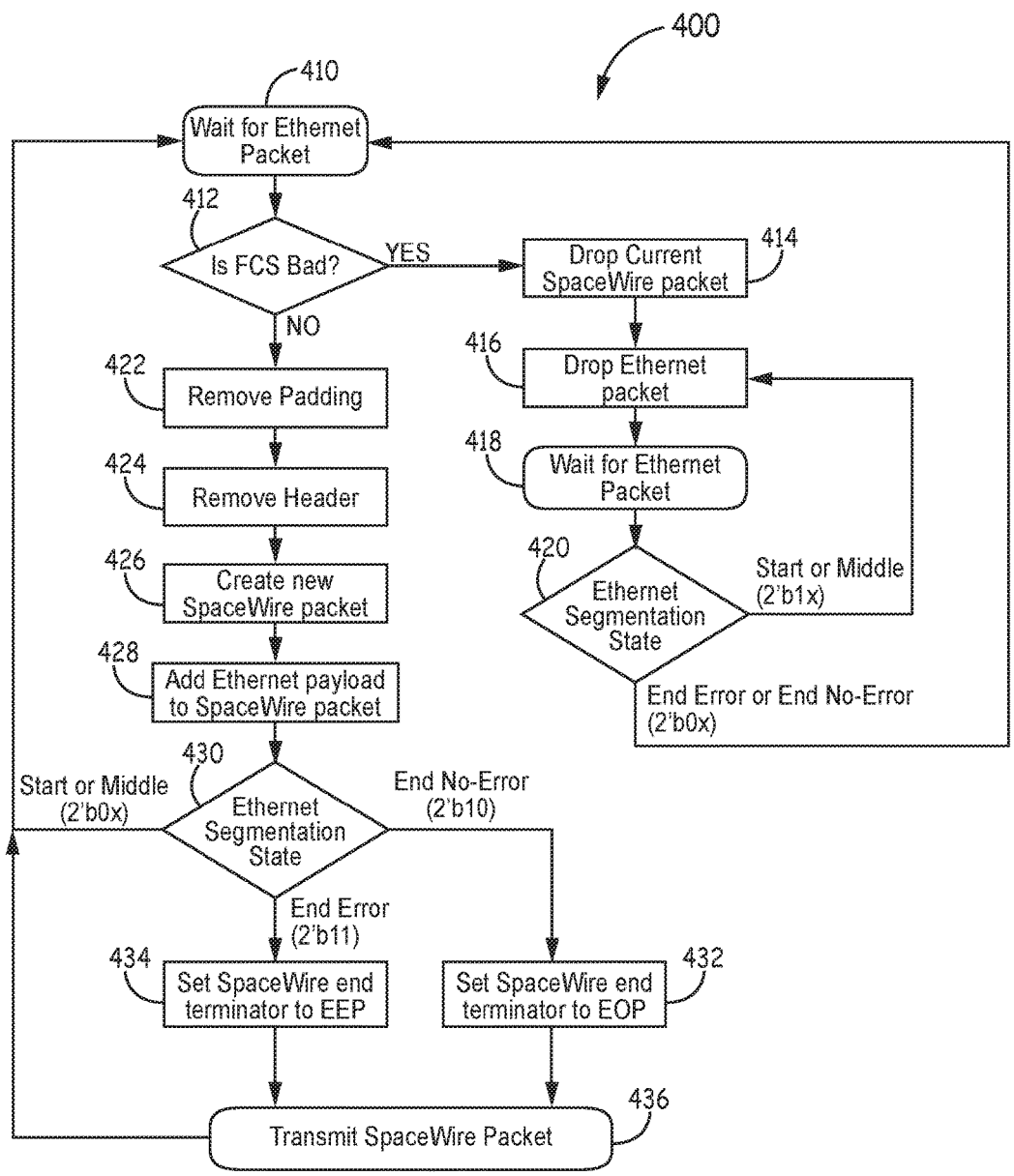
FIG. 4 is a flow diagram of a method for transmitting data packets from a processor/Ethernet device to a SpaceWire subsystem/network, according to one approach using a buffering technique.

FIG. 4 is a flow diagram of a method 400 for transmitting data packets from a processor/Ethernet device to a SpaceWire subsystem/network, according to one approach, using a buffering technique in the present Ethernet to SpaceWire bridge system. The method 400 can be implemented using digital logic implemented in the bridge system components.

Initially, method 400 waits for an Ethernet packet (block 410), and when an Ethernet packet is received, a determination is made whether the FCS of the Ethernet packet is bad (block 412). If the Ethernet packet is bad (invalid), a current SpaceWire packet is dropped (block 414) and the Ethernet packet is dropped (block 416). The method 400 then waits for another Ethernet packet (block 418), and when an Ethernet packet is received, an Ethernet segmentation state is determined (block 420). If the segmentation state is Start or Middle (2'b1x), method 400 repeats starting at block 416 and the Ethernet packet is dropped. If the segmentation state is End Error or End No Error (2'b0x), method 400 returns to block 410 to wait for another Ethernet packet and then repeats the above described steps thereafter.

If the FCS of the Ethernet packet is determined to be valid at block 412, the padding of the Ethernet packet is removed (block 422), and the header of the Ethernet packet is removed (block 424). A new SpaceWire packet is then created (block 426), and the Ethernet payload from the Ethernet packet is added to the SpaceWire packet (block 428). The method 400 then determines the Ethernet segmentation state (block 430). If the segmentation state is Start or Middle (2'b0x), method 400 returns to block 410 to wait for another Ethernet packet and repeats the above described steps thereafter. If the segmentation state is End No Error (2'b10), the SpaceWire end terminator is set to EOP (block 432), and the SpaceWire packet is transmitted (block 436). If the Ethernet segmentation state is End Error (2'b11), the SpaceWire end terminator is set to EEP (block 434), and the SpaceWire packet is transmitted (block 436). After the SpaceWire packet is transmitted, method 400 returns to block 410 to wait for another Ethernet packet and repeats the above described steps thereafter.

Figure 5:
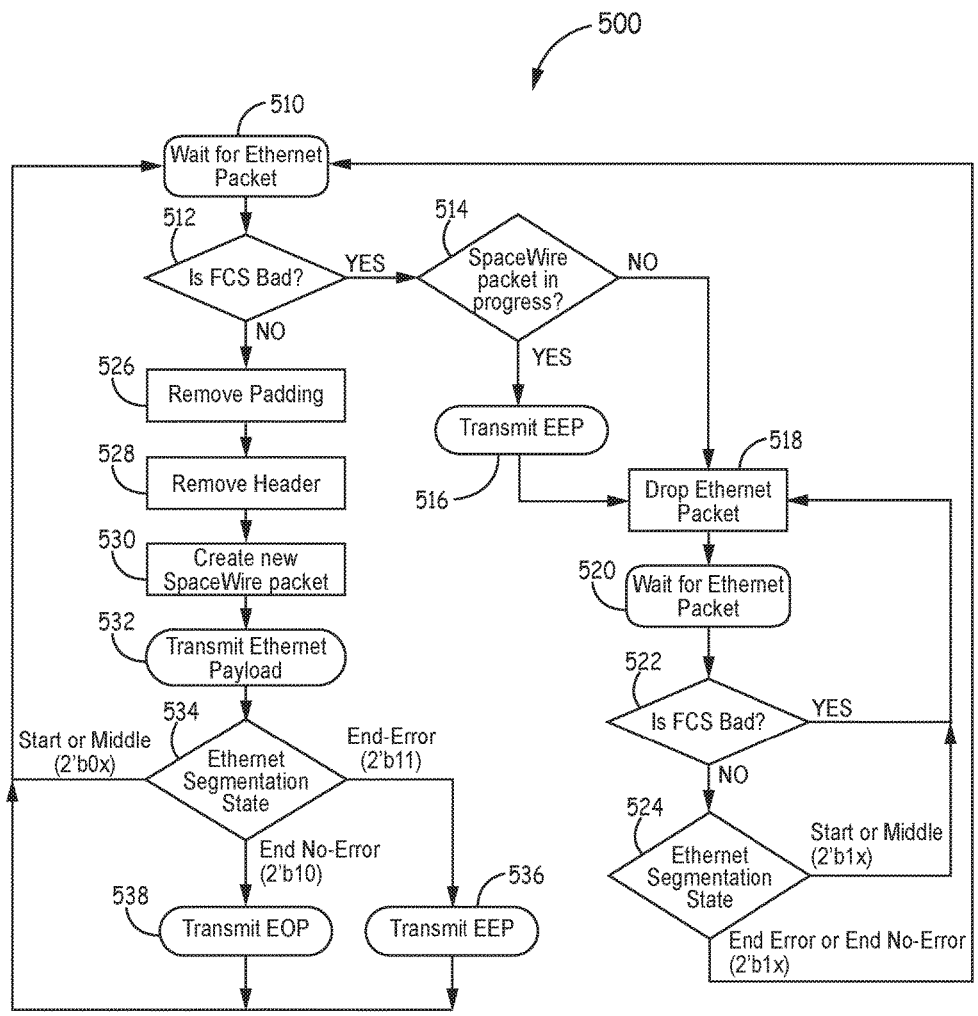
FIG. 5 is a flow diagram of a method for transmitting data packets from a processor/Ethernet device to a SpaceWire subsystem/network, according to another approach using a streaming technique.

FIG. 5 is a flow diagram of a method 500 for transmitting data packets from a processor/Ethernet device to a SpaceWire subsystem/network, according to one approach, using a streaming technique in the present Ethernet to SpaceWire bridge system. The method 500 can be implemented using digital logic implemented in the bridge system components.

Initially, method 500 waits for an Ethernet packet (block 510), and when an Ethernet packet is received, a determination is made whether the FCS of the Ethernet packet is bad (block 512). If the Ethernet packet is bad (invalid), a determination is made whether a SpaceWire packet is in progress (block 514). If a SpaceWire packet is in progress, an EEP is transmitted (block 516), and the Ethernet packet is dropped (block 518). If a SpaceWire packet is not in progress, the Ethernet packet is dropped immediately (block 518).

The method 500 then waits for another Ethernet packet (block 520), and when another Ethernet packet is received, a determination is made whether the FCS of this Ethernet packet is bad (block 522). If the FCS is bad (invalid), method 500 repeats starting at block 518 and drops this Ethernet packet. If the FCS of this Ethernet packet is not bad, an Ethernet segmentation state is determined (block 524). If the segmentation state is Start or Middle ($2'b1x$), method 500 repeats starting at block 518 and this Ethernet packet is dropped. If the segmentation state is End Error or End No Error ($2'b1x$), method 500 returns to block 510 to wait for another Ethernet packet and repeats the above described steps thereafter.

If the FCS of the Ethernet packet is determined to be valid at block 512, the padding of the Ethernet packet is removed (block 526), and the header of the Ethernet packet is removed (block 528). A new SpaceWire packet is then created (block 530), and the Ethernet payload is transmitted (block 532). The method 500 then determines the Ethernet segmentation state (block 534). If the segmentation state is Start or Middle ($2'b0x$), method 500 returns to block 510 to wait for another Ethernet packet and repeats the above described steps thereafter. If the segmentation state is End Error ($2'b11$), the EEP is transmitted (block 536). The method 500 then returns to block 510 to wait for another Ethernet packet and repeats the above described steps thereafter. If the segmentation state is End No Error ($2'b10$), the EOP is transmitted (block 538). The method 500 then returns to block 510 to wait for another Ethernet packet and repeats the above described steps thereafter.

Figure 6:
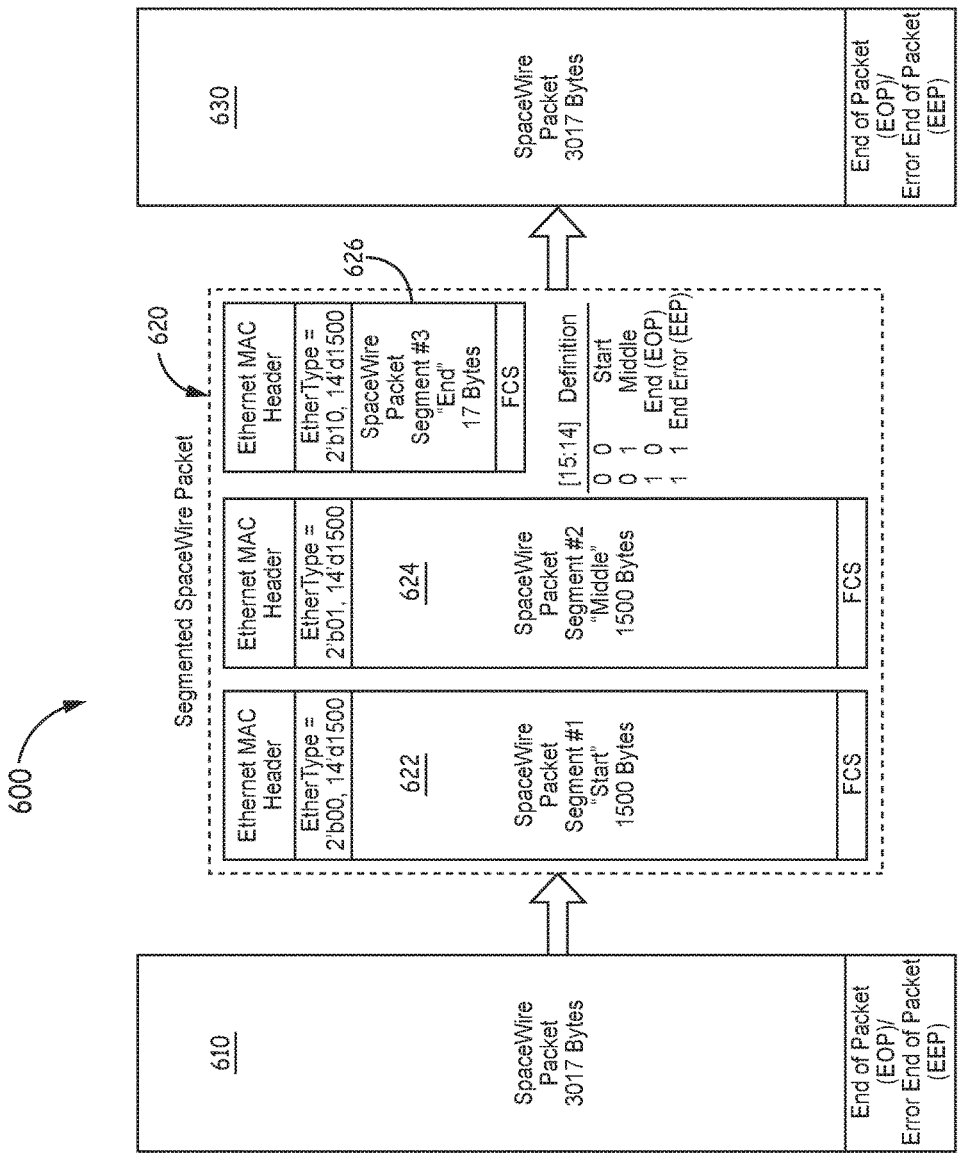
FIG. 6 is a block diagram of an exemplary segmenting operation for a SpaceWire data packet performed by the Ethernet to SpaceWire bridge.

FIG. 6 illustrates an example of a segmented packet operation 600 performed in the Ethernet to SpaceWire bridge system according to the present approach. A SpaceWire packet 610 having a total of 3017 bytes of data and an EOP/EEP is initially received. The SpaceWire packet 610 is converted into a segmented SpaceWire packet 620 having three packet segments. These include a first packet segment 622 marked with a segmentation state of "Start" and having 1500 bytes of data, a second packet segment 624 marked with a segmentation state of "Middle" and having 1500 bytes of data, and a third packet segment 626 marked with a segmentation state of "End" and having 17 bytes of data. Each of the packet segments also include an Ethernet MAC header, an EtherType, and an FCS. An embedded table in SpaceWire packet 620 includes the segmentation definition. The segmented SpaceWire packet 620 is output by the bridge device and received at a processor, which includes software that reassembles the packet segments 622, 624, 626 into a SpaceWire packet 630 having 3017 bytes of data, which corresponds to SpaceWire packet 610.

Figure 7:
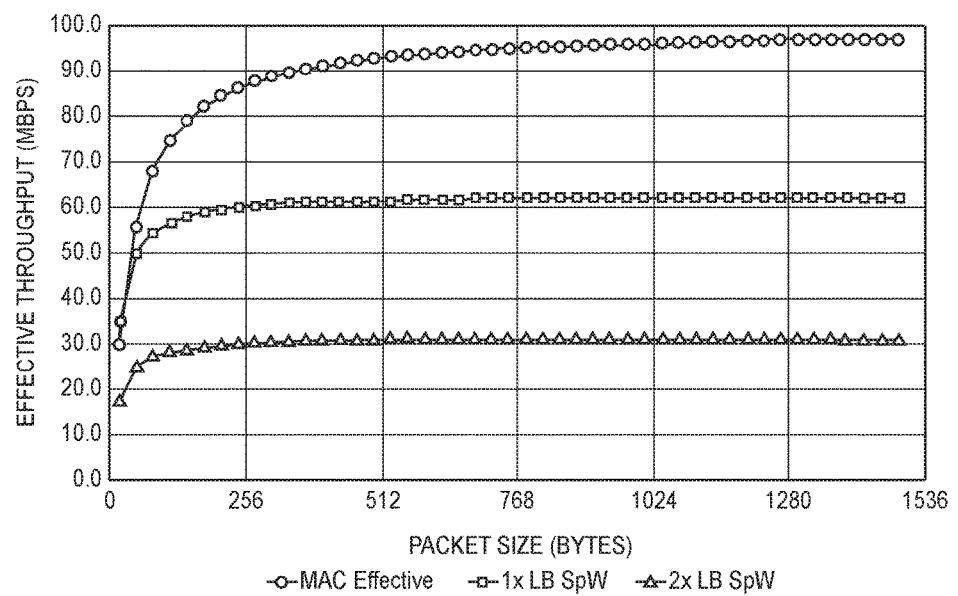
FIG. 7 is a graph showing an example of data throughput efficiency provided by the Ethernet to SpaceWire bridge.

The graph of FIG. 7 shows an example of data throughput efficiency provided by the Ethernet to SpaceWire bridge system of the present approach. In this example, a data packet had the following overhead. The header of the data packet had a preamble/SOF (start-of-frame delimiter) of 8 bytes; source and destination addresses of 12 bytes; Ethertype of 2 bytes; an FCS of 4 bytes; and an interpacket gap of 12 bytes; with a total of 38 bytes (304 bits) in the header. The data in the data packet had a minimum packet size of 46 bytes (368 bits), and a maximum packet size of 1500 bytes (12000 bits). The effective throughput for the minimum packet size was 54.76%, and the effective throughput for the maximum packet size was 97.53%. These results are depicted in the graph of FIG. 7. As shown, with increasing packet size, the effective throughput was much greater for the present bridge system (MAC Effective) than for conventional bridge systems (1×LB SpW and 2×LB SpW).

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a system for interfacing Ethernet with SpaceWire, the system comprising a processor including at least one Ethernet media access controller (MAC), and a bridge device operatively connected between the processor and a SpaceWire subsystem or network. The bridge device comprises: a SpaceWire physical interface operative to receive SpaceWire data packets from the SpaceWire subsystem or network; a receive first in first out (FIFO) buffer operative to receive the SpaceWire data packets from the SpaceWire physical interface; an Ethernet MAC packet builder operative to receive the SpaceWire data packets from the receive FIFO buffer, the Ethernet MAC packet builder including digital logic for segmentation of each of the SpaceWire data packets into Ethernet compatible packet segments; an Ethernet media independent interface operatively connected between the Ethernet MAC packet builder and the Ethernet MAC of the processor, the Ethernet media independent interface configured to receive the packet segments from the Ethernet MAC packet builder and to output the packet segments to the Ethernet MAC of the processor, and receive Ethernet data packets transmitted from the Ethernet MAC of the processor; an Ethernet MAC packet extractor operative to receive the Ethernet data packets from the Ethernet media independent interface, the Ethernet MAC packet extractor including digital logic for performing reassembly of the Ethernet data packets into SpaceWire compatible data packets; and a transmit FIFO buffer operative to receive the reassembled data packets from the Ethernet MAC packet extractor and to send the reassembled data packets to the SpaceWire physical interface for transmission to the SpaceWire subsystem or network.

Example 2 includes the system of Example 1, wherein the processor comprises a system-on-chip (SOC) processor.

Example 3 includes the system of any of Examples 1-2, wherein the processor further comprises a general input output (I/O) in operative communication with the bridge device through a sideband flow control interface.

Example 4 includes the system of any of Examples 1-3, wherein the Ethernet media independent interface comprises a standard media independent interface (MII), a reduced media independent interface (RMII), a gigabit media independent interface (GMII), or a reduced gigabit media independent interface (RGMII).

Example 5 includes the system of any of Examples 1-4, wherein the bridge device is implemented in an application specific integrated circuit (ASIC) or a field programmable gate array (FPGA).

Example 6 includes the system of any of Examples 1-5, wherein the bridge device is configured to receive a SpaceWire data packet up to a predefined maximum transfer unit (MTU) or an end of the SpaceWire data packet.

Example 7 includes the system of any of Examples 1-6, wherein during a data flow operation where data packets are transmitted from the SpaceWire subsystem or network to the processor, the Ethernet MAC packet builder operative to execute digital logic for performing a method comprising: (a) waiting for a SpaceWire packet; (b) holding active packet data of a received SpaceWire packet for processing; (c) resetting a segmentation state for the SpaceWire packet; (d) determining whether remaining data of the SpaceWire packet is greater than a MTU size; if the remaining data is greater than the MTU size, creating a new Ethernet packet segment with a payload of MTU size SpaceWire packet data; if the remaining data is not greater than the MTU size, creating a new Ethernet packet segment with a payload of the remaining SpaceWire packet data; (e) adding a configured Ethernet MAC Header to the new Ethernet packet segment; (f) if the configured Ethernet packet segment has a payload of MTU size SpaceWire packet data, determining whether the configured Ethernet packet segment is a first packet segment; if the configured Ethernet packet segment is a first packet segment, setting a segment state to start; if the configured Ethernet packet segment is not a first packet segment, setting the segment state to middle; (g) if the configured Ethernet packet segment has a payload of the remaining SpaceWire packet data, determining an active SpaceWire packet end type; if the end type is error end of packet (EEP), setting the segment state to end error; if the end type is end of packet (EOP), setting the segment state to end no-error; (h) determining whether a length of the Ethernet packet segment is less than an Ethernet minimum length; if the length of the packet segment is less than the Ethernet minimum length, padding the payload of the packet segment; (i) adding a calculated frame check sequence (FCS) to the Ethernet packet segment; and (j) transmitting the Ethernet packet segment to the processor.

Example 8 includes the system of Example 7, wherein the Ethernet MAC packet builder is operative to execute further digital logic comprising: (k) determining whether the transmitted Ethernet packet segment is a last segment of the SpaceWire packet; (l) if the transmitted Ethernet packet segment is not the last segment, returning to step (d) to determine whether any remaining data is greater than the MTU size and repeating the steps thereafter; and (m) if the transmitted Ethernet packet segment is the last segment, returning to step (a) to wait for a new SpaceWire packet and repeating the steps thereafter.

Example 9 includes the system of any of Examples 1-6, wherein during a buffered data flow operation where data packets are transmitted from the processor to the SpaceWire subsystem or network, the Ethernet MAC packet extractor operative to execute digital logic for performing a method comprising: (a) waiting for an Ethernet packet; (b) validating a FCS for a received Ethernet packet having an Ethernet payload; (c) when the FCE is valid, removing padding and a header from the received Ethernet packet; (d) creating a new SpaceWire packet; (e) adding the Ethernet payload to the SpaceWire packet; (f) determining an Ethernet segmentation state; (g) if the Ethernet segmentation state is start or middle, returning to step (a) to wait for another Ethernet packet; (h) if the Ethernet segmentation state is end no-error or end error, respectively setting an end terminator of the SpaceWire packet to EOP or EEP; and (i) transmitting the SpaceWire packet.

Example 10 includes the system of Example 9, wherein when the FCE is invalid, the Ethernet MAC packet extractor is operative to execute further digital logic comprising: (j) dropping a current SpaceWire packet; (k) dropping the received Ethernet packet; (l) waiting for a next Ethernet packet; (m) determining an Ethernet segmentation state for the next Ethernet packet; (n) if the segmentation state is start or middle, dropping the next Ethernet packet and returning to step (l); and (o) if the segmentation state is end error or end no-error, returning to step (a) to wait for another Ethernet packet and repeating the steps thereafter.

Example 11 includes the system of any of Examples 1-6, wherein during a streaming data flow operation where data packets are transmitted from the processor to the SpaceWire subsystem or network, the Ethernet MAC packet extractor operative to execute digital logic for performing a method comprising: (a) waiting for an Ethernet packet; (b) validating a FCS for a received Ethernet packet having an Ethernet payload; (c) when the FCE is valid, removing padding and a header from the received Ethernet packet; (d) creating a new SpaceWire packet; (e) transmitting the Ethernet payload; (f) determining an Ethernet segmentation state; (g) if the Ethernet segmentation state is start or middle, returning to step (a); and (h) if the Ethernet segmentation state is end no-error or end error, respectively transmitting an EOP or an EEP.

Example 12 includes the system of Example 11, wherein when the FCE is invalid, the Ethernet MAC packet extractor is operative to execute further digital logic comprising: (i) determining whether a SpaceWire packet is in progress; if a SpaceWire packet is in progress, transmitting an EEP for the received Ethernet packet, which is then dropped; if a SpaceWire packet is not in progress, dropping the Ethernet packet; (j) waiting for a next Ethernet packet; (k) validating an FCS for a received next Ethernet packet; (l) if the FCS is invalid for the next Ethernet packet, dropping the next Ethernet packet and returning to step (j); (m) if the FCS of the next Ethernet packet is valid, determining an Ethernet segmentation state for the next Ethernet packet; (n) if the Ethernet segmentation state is start or middle, dropping the next Ethernet packet and returning to step (j); and (o) if the Ethernet segmentation state is end error or end no-error, returning to step (a) to wait for another Ethernet packet and repeating the steps thereafter.

Example 13 includes a bridge device for connecting Ethernet to SpaceWire, the bridge device comprising: a SpaceWire physical interface operative to receive SpaceWire data from a SpaceWire network and to transmit SpaceWire data to the SpaceWire network; a receiver in operative communication with the SpaceWire physical interface and configured to receive packets of SpaceWire data from the SpaceWire physical interface; one or more configuration and status registers in operative communication with the receiver; a descriptor FIFO buffer in operative communication with the receiver and configured to receive descriptor information from the receiver; a receive FIFO buffer in operative communication with the receiver and configured to receive information from the receiver; an Ethernet MAC packet builder in operative communication with the descriptor FIFO buffer and the receive FIFO buffer, the Ethernet MAC packet builder operative to receive the SpaceWire data packets from the receive FIFO buffer, the Ethernet MAC packet builder including digital logic for segmentation of each of the SpaceWire data packets into Ethernet compatible packet segments; an Ethernet media independent interface in operative communication with the Ethernet MAC packet builder and the one or more configuration and status registers, the Ethernet media independent interface configured to output Ethernet data corresponding to the received SpaceWire data, and to receive Ethernet data for transmission to the SpaceWire network; an Ethernet MAC packet extractor in operative communication with the Ethernet media independent interface and the one or more configuration and status registers, the Ethernet MAC packet extractor configured to receive the Ethernet data from the Ethernet media independent interface and to output error signals to the one or more configuration and status registers, the Ethernet MAC packet extractor including digital logic for performing reassembly of the Ethernet data packets into SpaceWire compatible data packets; and a transmit data FIFO buffer in operative communication with the Ethernet MAC packet extractor, the transmit data FIFO buffer configured to send data packets to the SpaceWire physical interface for transmission to the SpaceWire network.

Example 14 includes the bridge device of Example 13, wherein the Ethernet media independent interface comprises a standard media independent interface (MII), a reduced media independent interface (RMII), a gigabit media independent interface (GMII), or a reduced gigabit media independent interface (RGMII).

Example 15 includes the bridge device of any of Examples 13-14, wherein the bridge device is implemented in an ASIC or a FPGA.

Example 16 includes the bridge device of any of Examples 13-15, wherein the bridge device is configured to receive a SpaceWire data packet up to a predefined maximum transfer unit (MTU) or an end of the SpaceWire data packet.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for interfacing Ethernet with SpaceWire, the system comprising:
    a processor including at least one Ethernet media access controller (MAC); and
    a bridge device operatively connected between the processor and a SpaceWire subsystem or network, the bridge device comprising:
        a SpaceWire physical interface operative to receive SpaceWire data packets from the SpaceWire subsystem or network;
        a receive first in first out (FIFO) buffer operative to receive the SpaceWire data packets from the SpaceWire physical interface;
        an Ethernet MAC packet builder operative to receive the SpaceWire data packets from the receive FIFO buffer, the Ethernet MAC packet builder including digital logic for segmentation of each of the SpaceWire data packets into Ethernet compatible packet segments;
        an Ethernet media independent interface operatively connected between the Ethernet MAC packet builder and the Ethernet MAC of the processor, the Ethernet media independent interface configured to:
            receive the packet segments from the Ethernet MAC packet builder and to output the packet segments to the Ethernet MAC of the processor; and
            receive Ethernet data packets transmitted from the Ethernet MAC of the processor;
        an Ethernet MAC packet extractor operative to receive the Ethernet data packets from the Ethernet media independent interface, the Ethernet MAC packet extractor including digital logic for performing reassembly of the Ethernet data packets into SpaceWire compatible data packets; and
        a transmit FIFO buffer operative to receive the reassembled data packets from the Ethernet MAC packet extractor and to send the reassembled data packets to the SpaceWire physical interface for transmission to the SpaceWire subsystem or network;
    wherein the bridge device is in operative communication with the Ethernet MAC without the use of an Ethernet physical interface layer.

2. The system of claim 1, wherein the processor comprises a system-on-chip (SOC) processor.

3. The system of claim 1, wherein the processor further comprises a general input/output (I/O) in operative communication with the bridge device through a sideband flow control interface.

4. The system of claim 1, wherein the Ethernet media independent interface comprises a standard media independent interface (MII), a reduced media independent interface (RMII), a gigabit media independent interface (GMII), or a reduced gigabit media independent interface (RGMII).

5. The system of claim 1, wherein the bridge device is implemented in an application specific integrated circuit (ASIC) or a field programmable gate array (FPGA).

6. The system of claim 1, wherein the bridge device is configured to receive a SpaceWire data packet up to a predefined maximum transfer unit (MTU) or an end of the SpaceWire data packet.

7. The system of claim 1, wherein during a data flow operation where data packets are transmitted from the SpaceWire subsystem or network to the processor, the Ethernet MAC packet builder operative to execute digital logic for performing a method comprising:
(a) waiting for a SpaceWire packet;
(b) holding active packet data of a received SpaceWire packet for processing;
(c) resetting a segmentation state for the SpaceWire packet;
(d) determining whether remaining data of the SpaceWire packet is greater than a maximum transfer unit (MTU) size;
if the remaining data is greater than the MTU size, creating a new Ethernet packet segment with a payload of MTU size SpaceWire packet data;
if the remaining data is not greater than the MTU size, creating a new Ethernet packet segment with a payload of the remaining SpaceWire packet data;
(e) adding a configured Ethernet MAC Header to the new Ethernet packet segment;
(f) if the configured Ethernet packet segment has a payload of MTU size SpaceWire packet data, determining whether the configured Ethernet packet segment is a first packet segment;
if the configured Ethernet packet segment is a first packet segment, setting a segment state to start;
if the configured Ethernet packet segment is not a first packet segment, setting the segment state to middle;
(g) if the configured Ethernet packet segment has a payload of the remaining SpaceWire packet data, determining an active SpaceWire packet end type;
if the end type is error end of packet (EEP), setting the segment state to end error;
if the end type is end of packet (EOP), setting the segment state to end no-error;
(h) determining whether a length of the Ethernet packet segment is less than an Ethernet minimum length;
if the length of the packet segment is less than the Ethernet minimum length, padding the payload of the packet segment;
(i) adding a calculated frame check sequence (FCS) to the Ethernet packet segment; and
(j) transmitting the Ethernet packet segment to the processor.

8. The system of claim 7, wherein the Ethernet MAC packet builder is operative to execute further digital logic comprising:
(k) determining whether the transmitted Ethernet packet segment is a last segment of the SpaceWire packet;
(l) if the transmitted Ethernet packet segment is not the last segment, returning to step (d) to determine whether any remaining data is greater than the MTU size and repeating the steps thereafter; and
(m) if the transmitted Ethernet packet segment is the last segment, returning to step (a) to wait for a new SpaceWire packet and repeating the steps thereafter.

9. The system of claim 1, wherein during a buffered data flow operation where data packets are transmitted from the processor to the SpaceWire subsystem or network, the Ethernet MAC packet extractor operative to execute digital logic for performing a method comprising:
(a) waiting for an Ethernet packet;
(b) validating a frame check sequence (FCS) for a received Ethernet packet having an Ethernet payload;
(c) when the FCS is valid, removing padding and a header from the received Ethernet packet;
(d) creating a new SpaceWire packet;
(e) adding the Ethernet payload to the SpaceWire packet;
(f) determining an Ethernet segmentation state;
(g) if the Ethernet segmentation state is start or middle, returning to step (a) to wait for another Ethernet packet;
(h) if the Ethernet segmentation state is end no-error or end error, respectively setting an end terminator of the SpaceWire packet to end of packet (EOP) or error end of packet (EEP); and
(i) transmitting the SpaceWire packet.

10. The system of claim 9, wherein when the FCS is invalid, the Ethernet MAC packet extractor is operative to execute further digital logic comprising:
(j) dropping a current SpaceWire packet;
(k) dropping the received Ethernet packet;
(l) waiting for a next Ethernet packet;
(m) determining an Ethernet segmentation state for the next Ethernet packet;
(n) if the segmentation state is start or middle, dropping the next Ethernet packet and returning to step (l); and
(o) if the segmentation state is end error or end no-error, returning to step (a) to wait for another Ethernet packet and repeating the steps thereafter.

11. The system of claim 1, wherein during a streaming data flow operation where data packets are transmitted from the processor to the SpaceWire subsystem or network, the Ethernet MAC packet extractor operative to execute digital logic for performing a method comprising:
(a) waiting for an Ethernet packet;
(b) validating a frame check sequence (FCS) for a received Ethernet packet having an Ethernet payload;
(c) when the FCS is valid, removing padding and a header from the received Ethernet packet;
(d) creating a new SpaceWire packet;
(e) transmitting the Ethernet payload;
(f) determining an Ethernet segmentation state;
(g) if the Ethernet segmentation state is start or middle, returning to step (a); and
(h) if the Ethernet segmentation state is end no-error or end error, respectively transmitting an end of packet (EOP) or an error end of packet (EEP).

12. The system of claim 11, wherein when the FCS is invalid, the Ethernet MAC packet extractor is operative to execute further digital logic comprising:
(i) determining whether a SpaceWire packet is in progress;
if a SpaceWire packet is in progress, transmitting an EEP for the received Ethernet packet, which is then dropped;
if a SpaceWire packet is not in progress, dropping the Ethernet packet;
(j) waiting for a next Ethernet packet;
(k) validating an FCS for a received next Ethernet packet;
(l) if the FCS is invalid for the next Ethernet packet, dropping the next Ethernet packet and returning to step (j);
(m) if the FCS of the next Ethernet packet is valid, determining an Ethernet segmentation state for the next Ethernet packet;

(n) if the Ethernet segmentation state is start or middle, dropping the next Ethernet packet and returning to step (j); and (o) if the Ethernet segmentation state is end error or end no-error, returning to step (a) to wait for another Ethernet packet and repeating the steps thereafter.

13. A bridge device for connecting Ethernet to SpaceWire, the bridge device comprising:

a SpaceWire physical interface operative to receive SpaceWire data from a SpaceWire network and to transmit SpaceWire data to the SpaceWire network;

a receiver in operative communication with the SpaceWire physical interface and configured to receive packets of SpaceWire data from the SpaceWire physical interface;

one or more configuration and status registers in operative communication with the receiver;

a descriptor first in first out (FIFO) buffer in operative communication with the receiver and configured to receive descriptor information from the receiver;

a receive FIFO buffer in operative communication with the receiver and configured to receive information from the receiver;

an Ethernet media access controller (MAC) packet builder in operative communication with the descriptor FIFO buffer and the receive FIFO buffer, the Ethernet MAC packet builder operative to receive the SpaceWire data packets from the receive FIFO buffer, the Ethernet MAC packet builder including digital logic for segmentation of each of the SpaceWire data packets into Ethernet compatible packet segments;

an Ethernet media independent interface in operative communication with the Ethernet MAC packet builder and the one or more configuration and status registers, the Ethernet media independent interface configured to output Ethernet data corresponding to the received SpaceWire data, and to receive Ethernet data for transmission to the SpaceWire network;

an Ethernet MAC packet extractor in operative communication with the Ethernet media independent interface and the one or more configuration and status registers, the Ethernet MAC packet extractor configured to receive the Ethernet data from the Ethernet media independent interface and to output error signals to the one or more configuration and status registers, the Ethernet MAC packet extractor including digital logic for performing reassembly of the Ethernet data packets into SpaceWire compatible data packets; and a transmit data FIFO buffer in operative communication with the Ethernet MAC packet extractor, the transmit data FIFO buffer configured to send data packets to the SpaceWire physical interface for transmission to the SpaceWire network;

wherein the bridge device is configured for communication with an Ethernet MAC, hosted by a processor, without the use of an Ethernet physical interface layer.

14. The bridge device of claim 13, wherein the Ethernet media independent interface comprises a standard media independent interface (MII), a reduced media independent interface (RMII), a gigabit media independent interface (GMII), or a reduced gigabit media independent interface (RGMII).

15. The bridge device of claim 13, wherein the bridge device is implemented in an application specific integrated circuit (ASIC) or a field programmable gate array (FPGA).

16. The bridge device of claim 13, wherein the bridge device is configured to receive a SpaceWire data packet up to a predefined maximum transfer unit (MTU) or an end of the SpaceWire data packet.

17. A system for interfacing Ethernet with SpaceWire, the system comprising:

a processor including at least one Ethernet media access controller (MAC); and a bridge device operatively connected between the processor and a SpaceWire subsystem or network, the bridge device comprising:

a SpaceWire physical interface operative to receive SpaceWire data packets from the SpaceWire subsystem or network;

a receive first in first out (FIFO) buffer operative to receive the SpaceWire data packets from the SpaceWire physical interface;

an Ethernet MAC packet builder operative to receive the SpaceWire data packets from the receive FIFO buffer, the Ethernet MAC packet builder including digital logic for segmentation of each of the SpaceWire data packets into Ethernet compatible packet segments;

an Ethernet media independent interface operatively connected between the Ethernet MAC packet builder and the Ethernet MAC of the processor, the Ethernet media independent interface configured to:

receive the packet segments from the Ethernet MAC packet builder and to output the packet segments to the Ethernet MAC of the processor; and receive Ethernet data packets transmitted from the Ethernet MAC of the processor;

an Ethernet MAC packet extractor operative to receive the Ethernet data packets from the Ethernet media independent interface, the Ethernet MAC packet extractor including digital logic for performing reassembly of the Ethernet data packets into SpaceWire compatible data packets; and a transmit FIFO buffer operative to receive the reassembled data packets from the Ethernet MAC packet extractor and to send the reassembled data packets to the SpaceWire physical interface for transmission to the SpaceWire subsystem or network;

wherein during a streaming data flow operation where data packets are transmitted from the processor to the SpaceWire subsystem or network, the Ethernet MAC packet extractor operative to execute digital logic for performing a method comprising:

(a) waiting for an Ethernet packet;

(b) validating a frame check sequence (FCS) for a received Ethernet packet having an Ethernet payload;

(c) when the FCS is valid, removing padding and a header from the received Ethernet packet;

(d) creating a new SpaceWire packet;

(e) transmitting the Ethernet payload;

(f) determining an Ethernet segmentation state;

(g) if the Ethernet segmentation state is start or middle, returning to step (a); and (h) if the Ethernet segmentation state is end no-error or end error, respectively transmitting an end of packet (EOP) or an error end of packet (EEP).

18. The system of claim 17, wherein when the FCS is invalid, the Ethernet MAC packet extractor is operative to execute further digital logic comprising:

(i) determining whether a SpaceWire packet is in progress;

if a SpaceWire packet is in progress, transmitting an EEP for the received Ethernet packet, which is then dropped;

if a SpaceWire packet is not in progress, dropping the Ethernet packet;

(j) waiting for a next Ethernet packet;

(k) validating an FCS for a received next Ethernet packet;

(l) if the FCS is invalid for the next Ethernet packet, dropping the next Ethernet packet and returning to step (j);

(m) if the FCS of the next Ethernet packet is valid, determining an Ethernet segmentation state for the next Ethernet packet;

(n) if the Ethernet segmentation state is start or middle, dropping the next Ethernet packet and returning to step (j); and (o) if the Ethernet segmentation state is end error or end no-error, returning to step (a) to wait for another Ethernet packet and repeating the steps thereafter.

19. The system of claim 17, wherein the processor comprises a system-on-chip (SOC) processor implemented on a single-board computer (SBC).

\* \* \* \* \*